United States Patent
Heinrichs et al.

(10) Patent No.: US 10,261,494 B2
(45) Date of Patent: Apr. 16, 2019

(54) METHOD FOR PROJECTING A PRODUCTION PROCESS AND COMPUTER PROGRAM AND COMPUTER SYSTEM FOR CARRYING OUT THE METHOD

(71) Applicant: FELSS Systems GmbH, Koenigsbach-Stein (DE)

(72) Inventors: Serjosha Heinrichs, Pforzheim (DE); Torben Luther, Freiburg (DE); Michael Marré, Karlsruhe (DE); Stefan Martin, Nesselwang (DE); Thomas Noeth, Koenigsbach-Stein (DE); Markus Preisinger, Marktoberdorf (DE)

(73) Assignee: FELSS Systems GmbH, Koenigsbach-Stein (DE)

( * ) Notice: Subject to any disclaimer, the term of this patent is extended or adjusted under 35 U.S.C. 154(b) by 0 days.

(21) Appl. No.: 15/477,271

(22) Filed: Apr. 3, 2017

(65) Prior Publication Data
US 2017/0285610 A1    Oct. 5, 2017

(30) Foreign Application Priority Data

Apr. 4, 2016    (EP) .................................... 16163673

(51) Int. Cl.
*G06F 11/30*    (2006.01)
*G05B 19/402*    (2006.01)
(Continued)

(52) U.S. Cl.
CPC .............. *G05B 19/402* (2013.01); *B21J 7/14* (2013.01); *B21J 7/46* (2013.01); *G05B 19/4097* (2013.01);
(Continued)

(58) Field of Classification Search
CPC .................................................... G05B 19/042
See application file for complete search history.

(56) References Cited

U.S. PATENT DOCUMENTS

| 7,016,745 B1 | 3/2006 | Dickerson et al. |
| 2002/0010523 A1 | 1/2002 | Gerken et al. |
| 2004/0186614 A1 | 9/2004 | Yamaguchi et al. |

FOREIGN PATENT DOCUMENTS

| DE | 100 23 668 | 12/2001 |
| EP | 1 443 374 | 8/2004 |
| EP | 1443371 | * 8/2004 |

* cited by examiner

*Primary Examiner* — Phuong Huynh
(74) *Attorney, Agent, or Firm* — Collard & Roe, P.C.

(57) ABSTRACT

A method for projecting a production process for producing a workpiece with a desired formation of a characteristic feature of the workpiece is implemented by a computer system. Using the method, the desired formation of the characteristic feature of the workpiece is detected and compared with formations of the characteristic feature of preceding workpieces. The formations of the characteristic feature of the preceding workpieces are stored in a formation database and a production parameter that is stored in a parameter database. When a formation of the characteristic feature of a preceding workpiece that is relevant to the desired formation of the characteristic feature is established with reference to the definition of the production parameter, the production parameter is defined for the production process for producing the workpiece with the desired formation of the characteristic feature.

11 Claims, 1 Drawing Sheet

(51) Int. Cl.
B21J 7/14 (2006.01)
B21J 7/46 (2006.01)
G05B 19/4097 (2006.01)
(52) U.S. Cl.
CPC .............. *G05B 2219/31048* (2013.01); *G05B 2219/36284* (2013.01)

METHOD FOR PROJECTING A PRODUCTION PROCESS AND COMPUTER PROGRAM AND COMPUTER SYSTEM FOR CARRYING OUT THE METHOD

CROSS-REFERENCE TO A RELATED APPLICATION

The invention described and claimed hereinbelow is also described in European Patent Application EP 16 163 673.3, filed on Apr. 4, 2016. The European Patent Application, the subject matter of which is incorporated herein by reference, provides the basis for a claim of priority of invention under 35 U.S.C. 119(a)-(d).

BACKGROUND OF THE INVENTION

The invention relates to a method, implemented by a computer system, for projecting a production process, in the context of which a workpiece is produced on the basis of an appropriately defined production parameter with a desired formation of a characteristic feature of the workpiece, and a computer program for carrying out of the method for projecting a production process, and a non-transitory computer-readable storage medium upon or within which a set of computer readable instructions is stored which upon processing by a computer system and the like implements the method.

A production process for producing a workpiece that is specified beforehand in terms of its quality requires extensive preparation. In the context of projecting the production process, the relevant production parameters must be defined in such a manner that a workpiece with the desired quality is produced as a result of the production process.

SUMMARY OF THE INVENTION

The present invention overcomes the shortcomings of known arts, such as those mentioned above.

To that end, the present invention provides a method for projecting a production process for producing a workpiece with a predetermined quality.

In an embodiment, the invention includes a computer-implemented method for projecting a production process for producing a workpiece with a predetermined quality, comprising the following steps:

detecting or determining the desired formation of the characteristic feature of the workpiece to be produced;

comparing the detected desired formation of the characteristic feature with formations of the characteristic feature of preceding workpieces, that is, preceding workpieces that have been produced during earlier production processes with the respective formation of the characteristic feature; the formations of the characteristic feature of the preceding workpieces are stored in a formation database of the computer system; a production parameter that is stored in a parameter database of the computer system and which is defined in an appropriate manner to carry out the relevant formation of the characteristic feature of a preceding workpiece is associated in each case with the formations stored in the formation database in respect of the characteristic feature of the preceding workpieces;

establishing a formation of the characteristic feature of a preceding workpiece that is relevant to the desired formation of the characteristic feature and is identical to the desired formation of the characteristic feature or from which the desired formation of the characteristic feature can be derived, with reference to the definition of the production parameter which is associated with the relevant formation of the characteristic feature of the preceding workpiece this production parameter is defined for the production process for producing the workpiece with the desired formation of the characteristic feature.

The desired formation of a characteristic feature of the workpiece that is intended to be produced is given in different manners. It is, for example, conceivable to detect the desired formation of a characteristic feature of the workpiece that is intended to be produced with reference to a written specification, directly by a sample component of the workpiece that is intended to be produced or with reference to a workpiece drawing. The detection may be carried out by manual input and/or by using conventional image-processing and/or image-producing methods, as known of the type of CAD applications. To detect the desired formation of a characteristic feature of the workpiece that is intended to be produced, the computer system according to the invention has a detection unit. The detection unit is configured such that a component contour can be manually input using an input mask and with reference to pre-produced drawings.

If the desired formation of the characteristic feature in question of the workpiece that is intended to be produced is detected, in order to project the subsequent production process, reference is made to experiences from similar cases in the past. By comparing the desired formation of the characteristic feature with formations of the same characteristic feature on preceding workpieces, which formations are stored in a formation database, it is verified whether, in the context of earlier production processes, the relevant characteristic feature has already been produced with a formation that corresponds to the desired formation or at least approximates to the desired formation. The comparison of the desired formation of the characteristic feature with formations of the same characteristic feature on preceding workpieces, which formations are stored in a database, is carried out by a comparison unit of the computer system. In this case, a processor unit of the computer system uses a data store of the computer system that contains the formation database.

There are associated with the formations of the relevant characteristic feature of preceding workpieces stored in the formation database production parameters that are stored in a parameter database including a definition of the production parameters, based on which the associated formation of the characteristic feature has been produced in the relevant previous production process. The parameter database is contained in another data store of the computer system according to the invention. Both the parameter database and the formation database can be continuously updated.

Possible production parameters include, for example, the production devices that have been used in the context of the earlier production process, such as, for example, production machines or tools, but also the process parameters of the earlier production process, such as, for example, the value of shaping forces that have been applied to a workpiece which is intended to be shaped.

If, during the comparison carried out by the numerical comparison unit of the desired formation of the relevant characteristic feature with the formation thereof in the case of earlier production processes, there is established an earlier formation that is relevant and which accordingly corresponds to the desired formation or can at least be used as a basis for the production of the desired formation, on the basis of the definition of the production parameter that is associated with the relevant earlier formation of the characteristic feature, the same production parameter is defined to carry out the desired formation of the characteristic feature. If the earlier formation is identical to the desired formation of the characteristic feature, the production parameter with the definition which brought about the earlier formation of the characteristic feature can be adopted for the future production process in an unchanged state. In the event of deviations between the desired formation and the earlier formation of the relevant characteristic feature, the definition thereof for the future production process is derived from the earlier definition of the production parameter. If, for example, a cylindrical shape having an inner diameter of 30 mm which is provided as a desired formation is intended to be produced as a characteristic feature, but from earlier production processes only a cylindrical shape having an inner diameter different from 30 mm is known, and if this was produced with a correspondingly sized (defined) tool diameter of a shaping tool (production parameter), the desired formation (inner diameter 30 mm) of the characteristic feature "cylindrical shape" is produced by corresponding adaptation of the earlier definition of the production parameter "tool diameter of the shaping tool." A numerical evaluation unit of the computer system according to the invention that is configured for this purpose is used to define the relevant production parameter for the future production process.

The above method steps are embodied in a computer program, i.e., a set of computer readable instructions, that are carried out on a computer system according to the invention. The computer program can be stored on a non-transitory computer-readable storage medium.

When the desired formation of a characteristic feature of the workpiece that is intended to be produced is compared with formations of the same characterising feature on preceding workpieces, a plurality of formations which are stored in the formation database can be identified as being relevant. From the plurality of relevant earlier formations, the optimum formation is selected as a basis for the definition of the associated production parameter of the future production process. Which of the relevant earlier formations is optimum and consequently intended to be preferred, is established with reference to one or more selection criteria. In the context of the method according to the invention, there are used as selection criteria:

the degree of similarity between the relevant formation of the characteristic feature and the desired formation of the characteristic feature, and/or wear on a tool, by which the preceding workpiece has been produced with the relevant formation, which wear is connected with the relevant formation of the characteristic feature, and/or a value of a processing force that is connected with the relevant formation of the characteristic feature and that has been applied during the production of the preceding workpiece to produce the relevant formation of the characteristic feature, and/or a process duration that is connected with the relevant formation of the characteristic feature to produce the preceding workpiece with the relevant formation of the characteristic feature, and/or a requirement for production devices which is connected with the relevant formation of the characteristic feature to produce the preceding workpiece with the relevant formation of the characteristic feature, and/or a material from which the preceding workpiece has been produced with the relevant formation of the characteristic feature.

For example, depending on the specific application, when selecting one of the relevant earlier formations as a preferred relevant formation, a plurality of selection criteria may be significant at the same time. In such cases, different weighting of the selection criteria used is conceivable.

There are many different characteristic features of a workpiece whose desired formation must be able to be carried out by the production process that is intended to be projected. For example, mechanical, thermal and/or tribological properties of the workpiece that is intended to be produced are conceivable. A particularly practice-relevant characteristic feature of workpieces that are intended to be produced is the workpiece geometry.

In an embodiment, particularly more complex workpiece geometries are first split into partial workpiece geometries. This splitting may follow generally valid rules or be carried out in accordance with the individual case.

If the production process to be projected is, for example, a shaping operation and if, in the context of this shaping process, on the basis of fixedly predetermined peripheral conditions, for instance, on the basis of the shaping tools that are in principle available, or on the basis of the nature of the shaping process, a specific geometric shape can be produced only in combination with another specific geometric shape, a rule for splitting the workpiece geometry into partial workpiece geometries that is generally valid for the projection of such production processes and that is consequently independent of the specific case is indispensable, on the basis of which rule there is not produced as a partial workpiece geometry any partial workpiece geometry that includes only one of the two geometric shapes that are necessarily combined with each other. A provision relating to the individual case for the "intelligent" splitting of the workpiece geometry of a workpiece that is intended to be produced in the future into partial workpiece geometries may, for example, take into account the frequency with which, in the context of production processes of the relevant type, geometric shapes are produced in combination with each other. If this frequency is high, it should consequently be anticipated that the relevant combination appears in a large number of preceding workpieces. If the combination appears on a workpiece which is intended to be produced in the future, in this specific case a splitting of the workpiece geometry of the workpiece that is intended to be produced in the future is recommended, which leads to a partial workpiece geometry that comprises the frequent combination of geometric shapes being produced.

After the splitting of the workpiece geometry into partial workpiece geometries, in the manner described above one or more, all the partial workpiece geometries is/are checked as to whether the desired formation of the partial workpiece geometry has already been produced in preceding workpieces in an identical or similar manner. If this is the case and if there are accordingly one or more relevant formations of the partial workpiece geometry on preceding workpieces, based on the definition of the production parameter(s) that has/have brought about the relevant formation(s) of the partial workpiece geometry in the past, the relevant production parameter(s) of the production process that is intended to be projected is defined. Subsequently, based on the production parameters that are then defined for producing the partial workpiece geometries with a desired formation of the relevant characteristic feature, the production process for producing the (overall) workpiece geometry with a desired formation of the relevant characteristic feature is developed.

In a development of the inventive method, the production parameter(s) that bring(s) about a desired formation of a transition that is provided between two mutually adjacent partial workpiece geometries is/are defined in a corresponding manner for the future production process. If the desired geometric relationship between two mutually adjacent partial workpiece geometries consists, for example, of a diameter increase by a specific value, it is verified whether and where applicable in which manner a geometric relationship that is relevant to the desired geometric relationship is produced on preceding workpieces. The definition of the relevant production parameter(s) in the context of the production processes that are carried out to produce the preceding workpieces acts, if applicable, as a basis for the definition of the same production parameter(s) of the production process that is intended to be projected.

From a plurality of relevant formations of the partial workpiece geometry of preceding workpieces, it also is possible according to the invention to make a selection based on one or more selection criteria and thereby to determine a preferred relevant formation. If a plurality of selection criteria is used, it is possible to weight these differently. Examples of selection criteria that are relevant in practice are set out above.

The selection criterion/criteria that is/are significant for the selection of a preferred relevant formation from a plurality of relevant formations of the partial workpiece geometry may vary according to the invention from partial workpiece geometry to partial workpiece geometry, but also may correspond to each other.

It is possible to consider as preceding workpieces whose characteristic features and whose formation are used according to define production parameters of the production process to be projected both finished components and intermediate products that have been produced during the production of preceding workpieces on the way to the finished component.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

Figure 1:
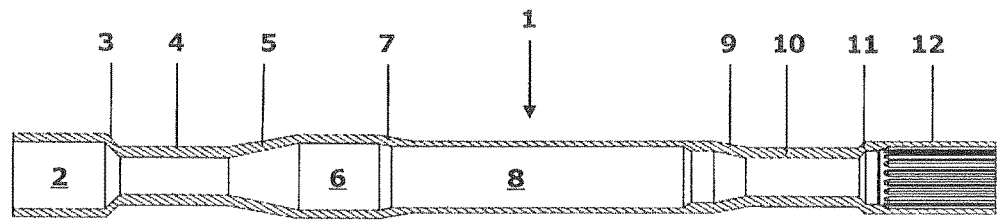
FIG. 1 shows a workpiece for the production of which a production process is intended to be projected.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

A production process is intended to be projected for producing a workpiece, in the present exemplary case for producing a rotationally symmetrical hollow shaft 1. The exemplary production process is intended to be a rotary swaging method, wherein the following description is also intended to be understood by way of example in this regard. An object of the production process that is intended to be projected is to produce hollow shafts with the formation of the workpiece geometry as carried out in the case of the hollow shaft 1 according to FIG. 1 (characteristic feature).

On the hollow shaft 1, the following components are sequential in an axial direction: a first cylindrical end portion 2, a first conical transition portion 3, a first cylindrical intermediate portion 4, a second conical transition portion 5, a second cylindrical intermediate portion 6, a third conical transition portion 7, a third cylindrical intermediate portion 8, a fourth conical transition portion 9, a fourth cylindrical intermediate portion 10, a fifth conical transition portion 11 and a second cylindrical end portion 12 (the last item with an inner tooth arrangement).

Figure 2:
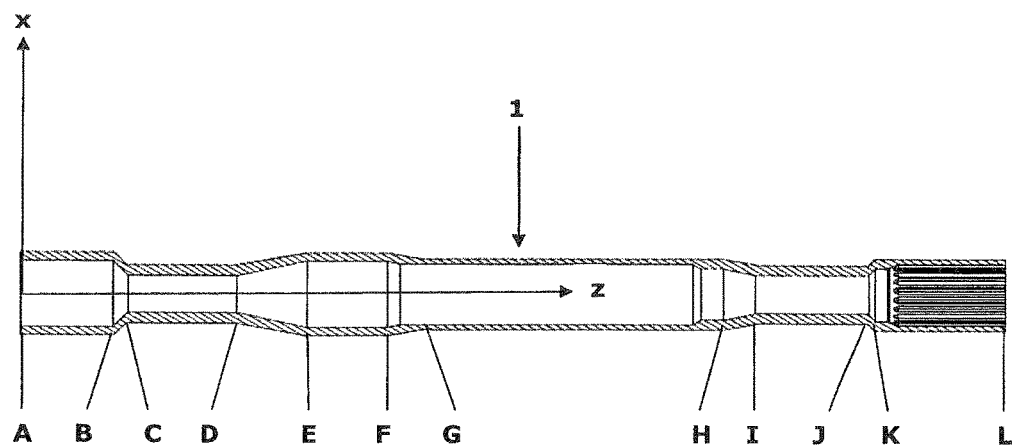
FIG. 2 shows the workpiece according to FIG. 1 with indicated splitting into partial workpiece geometries.
Figure 3:
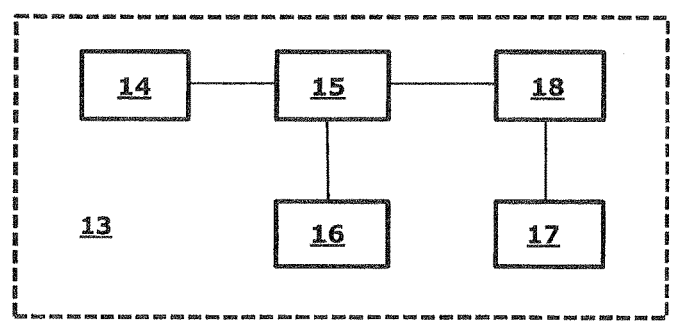
FIG. 3 is a highly schematic illustration of a computer system for projecting the production process for producing the workpiece according to FIGS. 1 and 2.

The production process is intended to be developed by a computer system 13, which is schematically shown in FIG. 3 and based on the technical workpiece drawing according to FIG. 1. For this purpose, initially the entire workpiece geometry of the hollow shaft 1 is detected based on the technical drawing by a detection unit 14 of the computer system 13. In this case, the technical drawing is formally reproduced in tabular form. This is carried out by the characteristic points of the workpiece geometry the points A to L according to FIG. 2, being defined in a computer-supported manner by their coordinates in a Cartesian coordinate system with an x axis and a z axis. The z axis extends parallel with the axis of symmetry of the rotationally symmetrical hollow shaft 1. The points A and L mark the start and end of the workpiece geometry. At the points B to K, a coordinate jump occurs in the case of the x coordinate.

Based on the table that describes the workpiece geometry, the workpiece geometry of the hollow shaft 1 is split into partial workpiece geometries in the detection unit 14 of the computer system 13, wherein each of the partial workpiece geometries is delimited according to FIG. 2 by two mutually adjacent points of the points A to L.

Each of the partial workpiece geometries of the hollow shaft 1 to be produced must have a specific formation, a so-called desired formation. The desired formation of a partial workpiece geometry is described in a computer-supported manner, on the one hand, by the coordinates that are obtained in the event of the detection of the entire workpiece geometry in respect of the points that delimit the partial workpiece geometry and the dimensions of the partial workpiece geometry derived therefrom and, on the other hand, by general premises such as, for example, the rotational symmetry and the wall thickness of the partial workpiece geometry.

If a description of the desired formation of a partial workpiece geometry is produced, a comparison is carried out by a comparison unit 15 of the computer system 13 between the desired formation of the partial workpiece geometry of the hollow shaft 1 that is intended to be produced and accordingly described formations of partial workpiece geometries of preceding workpieces that have been produced in the context of production processes that have already been projected and/or carried out. The formations of partial workpiece geometries of preceding workpieces are stored in a first data store 16 of the computer system 13 in the form of a formation database. The comparison unit 15 of the computer system 13 has access to the first data store 16.

Defined production parameters of a parameter database that is contained in a second data store 17 of the computer system 13 are associated with the formations stored in the first data store 16 in respect of partial workpiece geometries of preceding workpieces. The definition of the production parameters caused in the context of the earlier production methods the relevant formations of the partial workpiece geometries to be produced on the preceding workpieces.

Significant production parameters are the process method (for example, rotary swaging), the type of machine on which the production process is carried out, the type and quality of the production tool (for example, rotary swaging tool in conjunction with or without an inner mandrel) and/or the values of the process forces which are applied during the production method.

If, in the case of the comparison carried out by the comparison unit 15, a relevant formation of a partial workpiece geometry of a preceding workpiece is established that relevant formation corresponds identically to the desired formation of the partial workpiece geometry of the hollow shaft that is intended to be produced, the definition of the production parameters of the earlier production process is taken up in an unchanged state for the production process that is intended to be projected. An evaluation unit 18 of the computer system 13 defines the production parameters of the future production process accordingly.

If, in the case of the comparison that is carried out by the comparison unit 15, a relevant formation of a partial workpiece geometry of a preceding workpiece is established and, which relevant formation does not correspond identically to the desired formation of the partial workpiece geometry of the hollow shaft 1 that is intended to be produced, but is similar in the sense that the definition of the production parameters of the production process that is intended to be projected can be derived by a modification of that definition of the production parameters that resulted in the context of the earlier production process in a formation of the partial workpiece geometry of a preceding workpiece similar to the desired formation, a check is initially carried out as to how the diameter of a workpiece blank that is processed in order to produce the partial workpiece geometry of the preceding workpiece relates to the diameter of the partial workpiece geometry that is intended to be produced with the desired formation. The diameter information with respect to the preceding workpiece also is stored in the computer system 13.

The diameter comparison mentioned is specific in cases of the present type in which the production process that is intended to be projected is a method, in the context of which an increase of workpiece cross-sections is impossible as a result of the process. Consequently, only a formation of the partial workpiece geometry of preceding workpieces that has been produced based on a blank diameter which is equal to or greater than the diameter of the partial workpiece geometry that is intended to be produced with the desired formation may be relevant to the desired formation of the considered partial workpiece geometry of the hollow shaft 1.

If a formation of a partial workpiece geometry of a preceding workpiece is established, which formation is relevant in this sense, the evaluation unit 18 of the computer system 13 defines the production parameters of the future production process based on the definition of the production parameters of the earlier production process, which definition is associated with this formation.

If, in the case of the comparison that is carried out by the comparison unit 15, a plurality of relevant formations of a partial workpiece geometry of a preceding workpiece is established and they are similar to the desired formation of the partial workpiece geometry of the hollow shaft 1 that is intended to be produced, a formation is selected as a preferred relevant formation of the partial workpiece geometry from that plurality of formations of the partial workpiece geometry using a selection criterion. Selection criteria may include the degree of similarity between the known formation of the partial workpiece geometry and the desired formation of the partial workpiece geometry. Based on the definition of the production parameters that are associated with the preferred relevant formation of the partial workpiece geometry of preceding workpieces, the evaluation unit 18 of the computer system 13 defines the production parameters of the future production process.

In the last case mentioned, it also is conceivable for a plurality of selection criteria that can be weighted differently to be used to establish the preferred relevant formation of the partial workpiece geometry of preceding workpieces.

In the manner described, the production parameters for carrying out the desired formation of all the partial workpiece geometries of the hollow shaft 1 that is intended to be produced are defined. Subsequently, the definitions of the production parameters that are associated with the partial workpiece geometries are combined with each other for the comprehensive definition of the production parameters, based on which the hollow shaft 1 with the desired formation of the entire workpiece geometry is produced in the context of the production process which is intended to be projected.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for producing a workpiece with a desired workpiece geometry, which comprises two desired partial workpiece geometries that are mutually adjacent and mutually different and have a desired geometric relationship, comprising:
   producing partial workpiece geometries of preceding workpieces and geometric relationships of the partial workpiece geometries of preceding workpieces using production parameters;
   comparing the desired partial workpiece geometries with the partial workpiece geometries of the preceding workpieces and comparing a desired geometric relationship of the desired partial workpiece geometries with geometric relationships of the partial workpiece geometries of the preceding workpieces;
   defining production parameters for producing the desired partial workpiece geometries and the desired geometric relationship thereof if the partial workpiece geometries of the preceding workpieces and the geometric relationships of the partial workpiece geometries of the preceding workpieces are relevant by being identical with the desired partial workpiece geometries and the desired geometric relationship thereof or if the desired partial workpiece geometries and the desired geometric relationship thereof can be derived from the partial workpiece geometries of preceding workpieces and the geometric relationships of the partial workpiece geometries of preceding workpieces; and producing the partial workpiece geometries based on the defined production parameters.

2. The method according to claim 1, wherein if a plurality of relevant partial workpiece geometries and/or a plurality of relevant geometric relationships thereof is established, selecting one of the relevant partial workpiece geometries and/or one of the relevant geometric relationships thereof as a preferred relevant partial workpiece geometry and/or as a preferred relevant geometric relationship thereof in accordance with a selection criterion, and, based on the production parameter that has been used for producing the preferred relevant partial workpiece geometry and/or the preferred relevant geometric relationship thereof, defining the production parameter for producing the desired partial workpiece geometry and/or the desired geometric relationship thereof.

3. The method according to claim 2, further comprising using a selection criterion selected from the following group of selection criteria:
   a degree of similarity between the relevant partial workpiece geometry and/or the relevant geometric relationship thereof and the desired partial workpiece geometries and/or the desired geometric relationship thereof;
   wear on a tool by which the preceding workpiece has been produced with the relevant partial workpiece geometry and/or the relevant geometric relationship thereof, which wear is connected with the relevant partial workpiece geometry and/or the relevant geometric relationship thereof;
   a value of a processing force that is connected with the relevant partial workpiece geometry and/or the relevant geometric relationship thereof and that has been applied during the production of the preceding workpiece to produce the relevant partial workpiece geometry and/or the relevant geometric relationship thereof;
   a process duration that is connected with the relevant partial workpiece geometry and/or the relevant geometric relationship thereof, to produce the preceding workpiece with the relevant partial workpiece geometry and/or the relevant geometric relationship thereof;
   a requirement for production devices that is connected with the relevant partial workpiece geometry and/or the relevant geometric relationship thereof, to produce the preceding workpiece with the relevant partial workpiece geometry and/or the relevant geometric relationship thereof; and
   a material from which the preceding workpiece has been produced with the relevant partial workpiece geometry and/or the relevant geometric relationship thereof.

4. The method according to claim 3, wherein a plurality of selection criteria is used during the selection of one of the relevant partial workpiece geometries and/or one of the relevant geometric relationships thereof as a preferred relevant partial workpiece geometry and/or as a preferred relevant geometric relationship thereof.

5. The method according to claim 4, wherein the selection criteria are weighted differently.

6. The method according to claim 4,
   wherein the same selection criterion is used during the selection of the preferred relevant partial workpiece geometry for each of at least two desired partial workpiece geometries.

7. The method according to claim 1, wherein finished components or intermediate products are provided as preceding workpieces.

8. The method according to claim 1, wherein the method is carried out using a computer system.

9. The method according to claim 8, wherein the computer system
   detects the desired partial workpiece geometries and the desired geometric relationship thereof of the workpiece to be produced;
   compares the detected desired partial workpiece geometries with partial workpiece geometries of preceding workpieces and the detected desired geometric relationship of the desired partial workpiece geometries with geometric relationships of the partial workpiece geometries of preceding workpieces;
   establishes the relevant partial workpiece geometries and the relevant geometric relationship thereof; and
   defines the production parameters for producing the desired partial workpiece geometries and the desired geometric relationship thereof based on the production parameters that have been used for producing the relevant partial workpiece geometries and the relevant geometric relationship thereof.

10. A computer system for carrying out the method according to claim 9, comprising:
    a detection unit configured for detecting the desired partial workpiece geometries and the desired geometric relationship thereof of the workpiece to be produced;
    a first data store in which the partial workpiece geometries of preceding workpieces and the geometric relationships of the partial workpiece geometries of preceding workpieces are stored in a first database;
    a second data store in which production parameters that have been used for producing the partial workpiece geometries of preceding workpieces and the geometric relationships of the partial workpiece geometries of preceding workpieces are stored in a parameter database;
    a comparison unit configured for comparing the detected desired partial workpiece geometries with partial workpiece geometries of preceding workpieces and the detected desired geometric relationship of the desired partial workpiece geometries with geometric relationships of the partial workpiece geometries of preceding workpieces; and
    an evaluation unit configured for establishing the relevant partial workpiece geometries and the relevant geometric relationship thereof and for defining the production parameters for producing the desired partial workpiece geometries and the desired geometric relationship thereof based on the production parameters that have been used for producing the relevant partial workpiece geometries and the relevant geometric relationship thereof.

11. A non-transitory computer-readable storage medium that stores a computer program comprising a set of computer readable instructions, which, when executed by the computer, carry out all the steps of the method according to claim 9.

* * * * *